3,379,687
PRODUCTION OF POLYURETHANES, POLYTHIOURETHANES, AND RELATED POLYMERS USING ALKALI METAL CYANATES AND THIOCYANATES
Richard C. Doss and James T. Edmonds, Jr., Bartlesville, Okla., assignors to Phillips Petroleum Company, a corporation of Delaware
No Drawing. Filed Dec. 14, 1965, Ser. No. 513,838
16 Claims. (Cl. 260—47)

This invention relates to the production of urethane and thiourethane type polymers. In one aspect, it relates to the method of coreacting an organic polyhalide, an organic polyhydric compound, and an alkali metal cyanate or thiocyanate to form a polymer. In another aspect, it relates to a method of producing polyurethanes and polythiourethanes without the intermediate separation of isocyanates or isothiocyanates by forming and then reacting the isocyanates or isothiocyanates in situ. In still another aspect, it relates to the formation and immediate reaction of isocyanates and isothiocyanates by forming them in the presence of the active hydrogen containing compounds. In yet another aspect, it relates to the reaction of a compound having two or more active hydrogen atoms with an isocyanate or isothiocyanate formed from a polyhalo organic compound and alkali metal cyanates or thiocyanates in the presence of the compound having the active hydrogen atoms. In another aspect, it relates to a method of the preparation of polyurethanes and polythiourethanes without the necessity of handling toxic isocyanates or isothiocyanates by forming and reacting these toxic materials in a single step operation without the necessity of separating or handling them.

In recent years, polymers formed from urethanes and thiourethanes have achieved great importance in the chemical industry. Capable of forming tough, abrasion resistant films and castings, having excellent chemical resistance, they have found wide application in the coating and casting fields. In one type of application, they are caused to foam during the crosslinking reaction, thus producing a foam-like product which may vary in characteristics from extremely soft and flexible to rigid and friable. These foams have found application in padding, heat insulation, air filters, and numerous other uses.

The urethane polymers are normally prepared by reacting a polyisocyanate with a compound having a plurality of active hydrogen atoms. Generally, this latter compound is a polyether or polyester having a number of hydroxy radicals attached to the chain, but also included are compounds such as polycarboxylic acids, polyamines, polyamides, polyphenols, etc. The polyisocyanate generally used in this reaction is toluene diisocyanate, although numerous other polyisocyanates have been used.

One of the problems in producing urethane and thiourethane polymers is the toxicity of the isocyanates and thioisocyanates. These compounds are rather volatile and are irritating to the mucous membranes as well as being toxic. They can be handled only where excellent ventilation is possible, and this problem has restricted the use of urethane polymers in a number of applications. Additionally, the isocyanates and thioisocyanates are quite water reactive, and must be protected from contact with atmospheric moisture during storage and use. Numerous attempts have been made to alleviate the problems of handling the isocyanate materials.

It is, therefore, an object of this invention to produce a urethane or thiourethane polymer without handling or separation of toxic isocyanates and isothiocyanates. It is a further object of this invention to provide a method of forming polyurethanes and polythiourethanes from the starting materials in a one-step reaction. It is a further object of this invention to prepare polyurethanes and polythiourethanes from starting materials which are not susceptible to reaction with atmospheric moisture. It is still a further object of this invention to prepare polyurethanes and polythiourethanes from non-volatile, non-toxic starting materials. It is a yet a further object of this invention to convert innocuous starting materials into a polymer having urethane linkages.

These and other objects are accomplished by one or more, or other, of the aspects of my invention which is that polyurethanes and polythiourethanes are prepared by reacting simultaneously together an organic polyhalide, a compound having at least two active hydrogen atoms, and an alkali metal cyanate or thiocyanate. The polymers thus produced range from viscous liquids to high melting solids, depending upon the starting materials employed and upon the conditions under which the reaction is effected. As the reaction is carried out in a single operation, no isocyanate intermediate is isolated, thus making unnecessary the use of costly and hazardous isocyanates.

The polymers of my invention are useful in metal coatings, adhesives, printing inks, paper sizes, plasticizers, greases, lubricant additives, drilling mud additives, and other fields where known urethane and thiourethane polymers have found utility.

It is known that an N-substituted carbamate can be prepared by the reaction of a monovalent hydrocarbyl halide with an alkali metal cyanate and a monohydric or dihydric alcohol. Prior to my invention, however, there has not been a one-step process for the preparation of polymers by the reaction of polyhalo compounds with alkali metal cyanates or thiocyanates, and concurrent reaction with organic compounds having two or more active hydrogen atoms.

The organic polyhalo compounds which can be used in the process of this invention are those containing in the molecule at least two halogen atoms selected from the group consisting of chlorine, bromine, and iodine, preferably chlorine or bromine, each of said halogen atoms being attached to a saturated or unsaturated aliphatic or cycloaliphatic radical, or combination thereof, which can, if desired, have aromatic substitutes. Preferably, the halogen atoms are each attached to a different carbon atom. The polyhalo compounds preferably have at least two carbon atoms; they can be monomeric substances, or they can be polymers, e.g., halogenated polyethylene.

The alkali metal cyanates and alkali metal thiocyanates which can be used are the cyanate and thiocyanates of lithium, sodium, potassium, rubidium, and cesium.

Applicable compounds having two or more active hydrogen atoms are any of a wide variety of such substances. Some examples of such substances are polyhydric alcohols, polyhydric phenols, polythiols, urea, hydrazines, polyamides including polycarboxamides and polysulfonamides, polyamines, polycarboxylic acids, and the like. If desired, the compound containing the active hydrogen atoms can have in the molecule at least one of each of two or more of the groups containing an active hydrogen; e.g., the compound can be a hydroxy-substituted amine or a mercapto-substituted carboxylic acid. In most instances, the groups containing the active hydrogens are attached to saturated or unsaturated aliphatic or cycloaliphatic radicals, or aromatic radicals, or combinations thereof. Furthermore, the compound can be monomeric, or it can be a polymer, e.g., polyvinyl alcohol or polyethylene glycol.

In carrying out the process of this invention, the ratio of cyanate or thiocyanate groups to active hydrogen atoms to halogen atoms is usually about 1:1:1. However, this ratio can be varied considerably when it is desired to impart certain properties to the polymer. For example, when it is desired that fire retardancy be imparted to the polymer, the amount of a polyhalo compound having at least three halogen atoms in the molecule can be increased, thereby giving as a product a polymer containing desired halogen substituents. Similarly, if it is desired that the polymer posses substantial water solubility, the amount of a compound having at least three active hydrogen atoms in the molecule can be increased, thereby giving a polymer having groups containing the active hydrogen atoms. Thus, in instances in which such special properties are desired, the ratios of halogen atoms and cyanate or thiocyanate groups to active hydrogen atoms can each vary over a considerable range, e.g., within the range of 1:4 to 4:1.

It is also possible to prepare an isocyanate "prepolymer" by the process of my invention. These prepolymers are known in the polyurethane fields, and are generally procured by reacting only a part of the isocyanate groups present on the toluene diisocyanate with a hydroxy containing compound whereby a relatively low molecular weight polymer containing a number of free isocyanate groups is produced. The free isocyanate groups in such prepolymer molecules are less than 10 percent of the molecular weight, and often are less than 5 percent, as opposed to about 40 percent in the original toluene diisocyanate. These prepolymers, having less free isocyanate, are much less toxic and less reactive than the toluene diisocyanate itself, and give some relief from the handling problems of the toluene diisocyanate. Such a prepolymer can be prepared by the process of my invention by including in the reaction mass an excess of the polyhalo compound and the alkali metal cyanate or thiocyanate as compared to the active hydrogen containing component. The prepolymer thus formed will have some free isocyanate or isothiocyanate groups, depending upon the actual molar ratio of the three components in the reaction mixture. In the preparation of the prepolymer, the ratios of the halogen atoms and cyanate or thiocyanate groups to active hydrogen atoms in the starting materials can each vary from slightly greater than 1:1, e.g., 1.01:1, to 4:1, or even more.

Although the temperature employed in the process of this invention can vary over a wide range, it will generally be within the range of about 20–300° C., usually being within the range of about 50–250° C. The reaction time also varies over a broad range, depending in part on the nature of the reactants and the temperature employed, but will generally be within the range of about 1 minute to about 24 hours, usually being within the range of about 2 minutes to about 18 hours. If desired, an excess of either the polyhalo compound or the compound having the active hydrogen atoms can serve as a solvent. However, it is preferred that there be used a polar solvent which does not react with any of the components used or produced in the course of the reaction. The preferred polar solvents are tertiary amides such as:

N,N-dimethylformamide
N,N-diethylformamide
N,N-dimethylacetamide
N,N-diethylacetamide
N-methyl-N-phenylformamide
N-methylpyrrolidone
N-methylcaprolactam and nitriles such as acetonitrile and propionitrile. The solvent employed influences the molecular weight of the polymer, for separation of the polymer from solution prevents, for practical puroses, further polymerization of the separated polymer. The reaction pressure need be only that required to maintain the reactants and/or solvent substantially in the liquid phase.

The polymer is readily separated from the reaction mixture by conventional means such as decantation or filtration, with or without prior dilution with water, when the polymer is insoluble in the reaction mixture. Soluble polymers can be separated by conventional methods such as through dilution with water and subsequent decantation or filtration, or by filtration of inorganic salts followed by distillation of volatile components to give the polymer as a residue.

Examples of some organic polyhalo compounds which can be employed in the process of this invention include substances such as 1,2 - dichloroethane, 1,2 - dibromoethane, 1,2 - diiodoethane, 1,2 - dichloropropane, 1,3-dichloropropane, 1,3 - dibromopropane, 1,2 - dichlorobutane, 1,4 - dichlorobutane, 1 - chloro - 4 - bromobutane, 1,4 - dibromobutane, 1,8 - diiodooctane, 1,12-dichlorododecane, 1,2 - dichloro - 3 - methylbutane, 3,4-dichloro - 3 - ethylhexane, 1,2,3 - trichloropropane, 1,2,3,4 - tetrabromobutane, 1,2 - dichloro - 3 - butene, 1,4 - dichloro - 2 - butene, 1,2,3,4 - tetrachloro - 2-butene, 3,4 - dibromo - 4 - methyl - 1 - pentene, 1,4 - dichloro - 2 - butyne, 1,3 - diiodocyclopentane, 1,4 - dibromocyclohexane, 1 - methyl - 2,3,4,5 - tetrachlorocyclopentane, 4,5 - dichlorocyclohexene, 3 - methyl-4,5 - dibromocyclopentene, α,α' - dichloro - p - xylene, α,α',2,5 - tetrachloro - p - xylene, 1 - phenyl - 2,3 - dichloropropane, 1 - cyclohexyl - 2,3,4 - trichlorobutane, 1 - phenyl - 2,4 - dibromocyclopentane, chlorinated polyethylene, chlorinated polypropylene, polyvinyl chloride, and the like.

Examples of some compounds having two or more active hydrogen atoms which can be employed in the process of this invention includes substances such as ethylene glycol, glycerol, 1,2 - propanediol, 1,3 - propanediol, 1,4 - butanediol, 1,2,6 - hexanetriol, 1,12 - dodecanediol, 2 - butene 1,4 - diol, 3 - phenyl - 1,2 - propanediol, 2,2 - dimethyl - 1,3 - propanediol, pentaerythritol, 1,2-cyclopentanediol, polyethylene glycol, polypropylene glycol, polyvinyl alcohol, glucose, sucrose, starch, p-xylene - α,α' - diol, hydroquinone, resorcinol, pyrocatechol, phloroglucinol, 4,4' - diphenol, 4,4' - isopropylidenediphenol, 1,2 - ethanedithiol, 1,2 - propanedithiol, 1,3 - propanedithiol, 1,2,3 - propanetrithiol, 1,4-butanedithiol, 3 - (2 - mercaptoethyl)cyclohexanethiol, 4 - (2 - mercaptoethyl)cyclohexanethiol, 1,2 - cyclohexanedithiol, m - xylene - α,α' - dithiol, 1,4 - benzenedithiol, toluene - 3,4 - dithiol, urea, hydrazine, N,N - dimethylhydrazine, N,N' - diethylhydrazine, N,N' - diphenylhydrazine, oxamide, succinamide, adipamide, benzene - 1,3 - disulfonamide, ethylenediamine, N,N' - dimethylethylenediamine, 1,3 - diaminopropane, diethylenetriamine, m - phenylenediamine, o - xylene - α,α'-diamine, oxalic acid, succinic acid, adipic acid, phthalic acid, terephthalic acid, isophthalic acid, 4 - cyclohexene-1,2 - dicarboxylic acid, 2 - aminoethanol, 2 - mercaptopropionic acid, glycine, cysteine, and the like.

EXAMPLE I

A stirred mixture of 34.9 g. (0.2 mole) of α,α'-dichloro-p-xylene, 18 g. (0.2 mole) of 1,4-butanediol, and 300 ml. of N,N-dimethylformamide was heated to 135° C., whereupon 32.4 g. (0.4 mole) of potassium cyanate was added over a 1-minute period. Shortly after completion of the addition of the cyanate, the temperature suddenly rose to 151° C., and vigorous boiling and some foaming occurred. After the reaction had somewhat subsided, the mixture was stirred at 150° C. for 1 hour. The reaction mixture was cooled to 25° C. and filtered. The separated solid, after being washed with N,N-dimethylformamide and with ether, followed by air-drying, weighed 29.6 g. The solvent was evaporated from the filtrate, and the residue was air-dried overnight to give 61.7 g. of yellow solid, which was mixed with acetone, pulverized in a blender, filtered, and air-dried. The resulting polymer, which weighed 49 g., became transparent and softened at 185° C., and melted at 196° C. Elemental analysis of the polymer showed it contained 60.2 weight percent carbon, 6.7 weight percent hydrogen, and 10.3 weight percent nitrogen. These values agree well with the theoretical values of 60.4 weight percent carbon, 6.5 weight percent hydrogen, and 9.7 weight percent nitrogen for a polymer having the structure

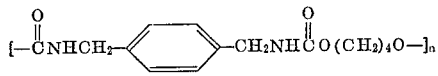

The polymer obtained was insoluble in benzene, methanol, ether, water, tetrahydrofuran, triethylamine, acetonitrile, acetone, and ethylene chloride; the polymer in N,N-dimethylformamide resulted in a cloudy solution.

EXAMPLE II

A stirred mixture of 22.6 g. (0.2 mole) of 1,3-dichloropropane, 15.2 g. (0.2 mole) of 1,2-propanediol, and 250 ml. of N,N-dimethylformamide was heated to 120° C., whereupon 32.4 g. (0.4 mole) of potassium cyanate was added. The mixture was then heated at 140° C. until reaction began to occur. A slightly exothermic reaction caused the temperature to rise to 151° C., with vigorous boiling. The mixture was then stirred at 150° C. for 1 hour, after which it was cooled, and 35.4 g. of solid was removed by filtration. The filtrate was concentrated to a syrup which was washed with ether. The residual product was dissolved in acetone. After the mixture had stood overnight in a freezer, a small amount of water-soluble, white crystalline material presumed to be potassium chloride was removed by filtration, and the solvent was removed from the filtrate on a steam bath to give approximately 27 g. of syrup. Elemental analysis of the syrup, after further concentration on a steam bath under reduced pressure, showed the resulting syrupy polymer contained 47.7 weight percent carbon, 7.3 weight percent hydrogen, and 13.4 weight percent nitrogen. These values agree well with the theoretical values of 47.5 weight percent carbon, 6.9 weight percent hydrogen, and 13.8 weight percent nitrogen for a polymer having the structure

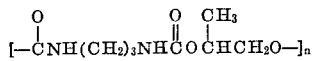

The polymer obtained was insoluble in benzene, ether, triethylamine, and ethylene chloride, and soluble in methanol, tetrahydrofuran, acetonitrile, N,N-dimethylformamide, acetone, and hot water. The polymer formed in this run has no aromatic nuclei in the polymer chain.

EXAMPLE III

A stirred mixture of 52.5 g. (0.3 mole) of α,α'-dichloro-p-xylene, 68.4 g. (0.3 mole) of 4,4'-isopropylidenediphenol, and 300 ml. of N,N-dimethylformamide was heated to 140° C., after which 48.7 g. (0.6 mole) of potassium cyanate was added over a period of 18 minutes. The mixture was then heated at 140–150° C., with stirring, for 18 hours. The reaction mixture was cooled, and 48.2 g. of solid was removed by filtration. The filtrate was concentrated on a steam bath, under reduced pressure, to give 152.7 g. of sticky residue which did not crystallize on standing. A portion of this residue was treated with hot isopropyl alcohol, and the mixture was cooled and stirred rapidly, whereupon the residue became whiter and very gummy. Ether was then added, and the mixture was stirred and ground until a fine crystalline powder formed. The powder was filtered and dried. The dried powder foamed or bubbled at about 137° C., but it did not melt when heated to 230° C. Elemental analysis of this powder showed it contained 68.2 weight percent carbon, 6.6 weight percent hydrogen, and 8.7 weight percent nitrogen. A polymer having the structure

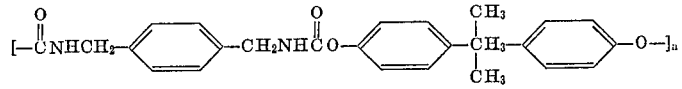

would have a theoretical analysis of 72.0 weight percent carbon, 8.0 weight percent hydrogen, and 9.3 weight percent nitrogen. This polymer has aromatic nuclei contributed both by the polyhalide and by the active hydrogen containing compound.

EXAMPLE IV

A stirred mixture of 5.75 g. (0.045 mole) of 1,4-dichlorobutane, 68 g. (0.045 mole) of polyethylene glycol having an average molecular weight of 1500 (Union Carbide's Carbowax 1500), and 150 ml. of N,N-dimethylformamide was heated to 140° C., and 7.35 g (0.0905 mole) of potassium cyanate was added portionwise. The mixture was then heated at 140–145° C. for 1 hour. The resulting reaction mixture was cooled, and 5.8 g. of solid was removed by filtration. Removal of volatile material from the filtrate by heating on a steam bath, under reduced pressure, gave 73.0 g. of wax containing 51.4 weight percent carbon, 9.0 weight percent hydrogen, and 1.8 weight percent nitrogen. These values agree well with the theoretical values of 53.6 weight percent carbon, 8.9 weight percent hydrogen, and 1.7 weight percent nitrogen for a polymer having the structure

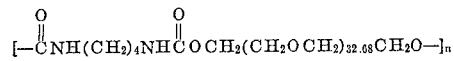

the polyethylene glycol reactant being represented by the formula $HOCH_2(CH_2OCH_2)_xCH_2OH$, where $x$ has an average value of 32.68. The polymeric product was insoluble in ether and triethylamine; it was soluble in benzene, methanol, water, tetrahydrofuran, acetonitrile, N,N-dimethylformamide, acetone, and ethylene chloride. This example shows the use of a polymeric hydrogen containing reactant with an aliphatic polyhalide.

EXAMPLE V

To a stirred mixture of 20 g. of polyvinyl alcohol (Du Pont's Elvanol, Grade 71–24) and 170 ml. of N,N-dimethylformamide, at 135–140° C., were added 2.4 g. (0.03 mole) of potassium cyanate and 2.5 g. (0.015 mole) of α,α'-dichloro-p-xylene. Stirring was continued for 2–3 minutes, resulting in the formation of a rubbery polymer. The reaction mixture was heated in boiling acetone, and the solid product was washed with water and with acetone, giving 39 g. of very rubbery polymer. This polymer slowly darkened when heated above 200° C., becoming nearly black when heated to 268° C., but did not melt when heated to 305° C. Elemental analysis of the rubbery polymer showed it contained 44.0 weight percent carbon, 8.8 weight percent hydrogen, and 3.3 weight percent nitrogen. This example shows the use of a polymeric polyhydric component with an aromatic substituted polyhalide.

EXAMPLE VI

A stirred mixture of 25.4 g. (0.2 mole) of 1,4-dichlorobutane, 12.0 g. (0.2 mole) of urea, and 250 ml. of N,N-dimethylformamide was heated to 135° C., and 32.4 g. (0.4 mole) of potassium cyanate was added over a period of 0.5–1.0 minute. The resulting mixture was stirred and heated at 150° C. for 1 hour. The reaction mixture was cooled, and 31.5 g. of white solid was removed by filtration. Removal of volatile material from the filtrate by heating on a steam bath, under reduced pressure, gave 45.0 g. of thick syrupy, sticky polymer. The polymer was removed from the flask with the aid of a heat gun. When the light orange, tar-like material was heated in an oven at 100° C. for 15 hours, the resulting polymer, upon cooling, was a dark orange, brittle solid containing 42.7 weight percent carbon, 6.6 weight percent hydrogen, and 28.5 weight percent nitrogen. These values agree well with the theoretical values of 42.0 weight percent carbon, 6.1 weight percent nydrogen, and 28.0 weight percent nitrogen for a polymer having the structure

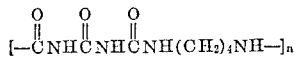

The polymer, both before and after the heat treatment at 100° C. for 15 hours, was insoluble in benzene, ether, tetrahydrofuran, triethylamine, acetonitrile, acetone, and ethylene chloride, partially insoluble in methanol and water, and soluble in N,N-dimethylformamide. This example shows the use of urea in the process of our invention.

EXAMPLE VII

To a mixture of 50 g. of polyvinyl alcohol (Du Pont's Elvanol, Grade 71–24) and 1 liter of N-methylpyrrolidone at 100° C. was added 17.5 g. (0.1 mole) of $\alpha,\alpha'$-dichloro-p-xylene, and the resulting mixture was stirred at 100° C. for 10 minutes. Then 19.4 g.(0.2 mole) of potassium thiocyanate was added, and stirring at 100° C. was continued for 1 hour. The temperature was then raised to 190° C., with stirring, over a period of 1 hour. The reaction mixture was poured into 4 liters of water, and the resulting mixture was allowed to stand overnight. From the mixture was recovered by decantation a water-insoluble polymer which was washed with hot water and then with acetone. The dried polymer, a polythiourethane, was a hard, tan, water-insoluble solid weighing 31 g. This example shows the production of a polythiourethane by the process of our invention.

Reasonable variation and modification are possible within the scope of the foregoing disclosure and the appended claims to the invention, the essence of which is that a urethane or thiourethane type polymer can be formed by reacting simultaneously together an organic polyhalide compound having at least two active hydrogen atoms, and an alkali metal cyanate or thiocyanate.

We claim:
1. Process of forming a polymer comprising reacting simultaneously together:
 (A) a polyhalo organic compound, containing in the molecule at least two halogen atoms selected from the group consisting of chlorine, bromine, and iodine, each of said halogen atoms being attached to a saturated or unsaturated aliphatic or cycloaliphatic radical, or combination thereof, which radical may have aromatic substituents,
 (B) a compound having at least two active hydrogen atoms, and
 (C) an alkali metal cyanate or thiocyanate.
2. Process of claim 1 wherein said polyhalo organic compound has at least two halogen atoms attached to aliphatic or cycloaliphatic radicals.
3. Process of claim 1 wherein said compound having at least two active hydrogen atoms is selected from polyhydric alcohols, polyhydric phenols, polythiols, urea, hydrazines, polyamides, polyamines, polycarboxylic acids, and substituted alcohols, phenols, thiols, hydrazines, amides, amines, and acids having at least one active hydrogen atom in addition to the stated functional group.
4. Process of claim 1 wherein:
 A is $\alpha,\alpha$-dichloro-p-xylene,
 B is butanediol, and
 C is alkali metal cyanate.
5. Process of claim 1 wherein:
 A is dichloropropane,
 B is propanediol, and
 C is alkali metal cyanate.
6. Process of claim 1 wherein:
 A is $\alpha,\alpha'$-dichloro-p-xylene,
 B is 4,4'-isopropylidenediphenol, and
 C is alkali metal cyanate.
7. Process of claim 1 wherein:
 A is dichlorobutane,
 B is polyethylene glycol, and
 C is alkali metal cyanate.
8. Process of claim 1 wherein:
 A is $\alpha,\alpha'$-dichloro-p-xylene,
 B is polyvinyl alcohol, and
 C is alkali metal cyanate.
9. Process of claim 1 wherein:
 A is dichlorobutane,
 B is urea, and
 C is alkali metal cyanate.
10. Process of claim 1 wherein:
 A is $\alpha,\alpha'$-dichloro-p-xylene,
 B is polyvinyl alcohol, and
 C is alkali metal thiocyanate.
11. Process of claim 1 wherein the reaction takes place in a polar solvent which is non-reactive with the reacting components.
12. Process of claim 11 wherein said polar solvent is selected from N,N-dimethylformamide, N,N-diethylformamide, N,N-dimethylacetamide, N,N-diethylacetamide, N-methyl-N-phenylformamide, N-methylpyrrolidone, N-methylcaprolactam, acetonitrile and propionitrile.
13. Process of claim 1 wherein the ratio of cyanate or thiocyanate groups to active hydrogen atoms to halogen atoms is substantially 1:1:1.
14. Process of claim 1 wherein the number of halogen atoms is substantially in excess of the numbers of active hydrogen atoms and cyanate or thiocyanate groups whereby the fire retardancy of said polymer is increased.
15. Process of claim 1 wherein the number of active hydrogen atoms is substantially in excess of the numbers of halogen atoms and cyanate or thiocyanate groups whereby the water solubility of said polymer is increased.
16. Process of claim 1 wherein the number of active hydrogen atoms is substantially less than the numbers of halogen atoms and cyanate or thiocyanate groups whereby said polymer contains free isocyanate or isothiocyanate groups.

No references cited.

W. H. SHORT, *Primary Examiner.*

L. LEE, *Assistant Examiner.*